T. H. BOWER.
JOURNAL BEARING.
APPLICATION FILED MAY 25, 1918.

1,297,073.

Patented Mar. 11, 1919.
2 SHEETS—SHEET 1.

Witnesses
J. H. Crawford

Inventor
T. H. Bower,
By Victor J. Evans
Attorney

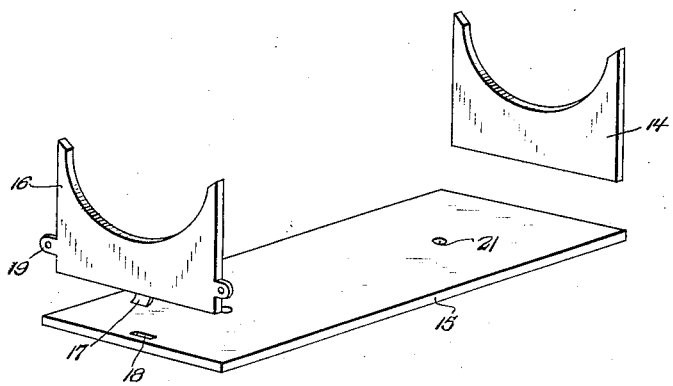
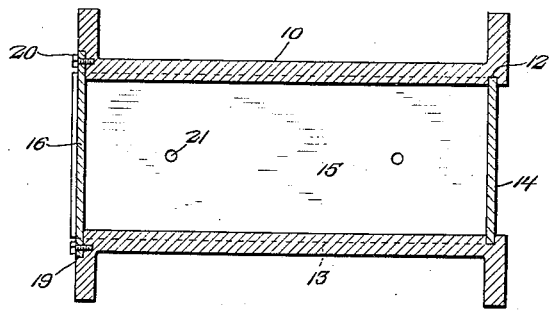
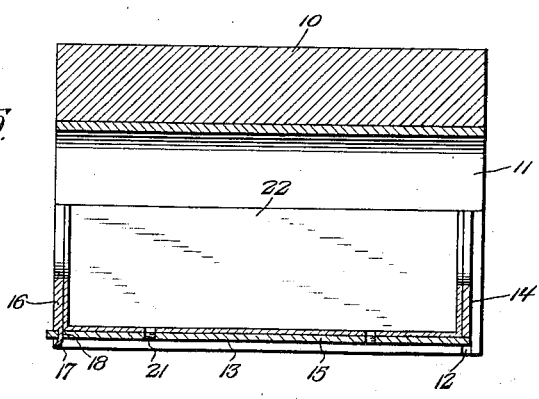

UNITED STATES PATENT OFFICE.

THOMAS H. BOWER, OF RICHMOND, VIRGINIA.

JOURNAL-BEARING.

1,297,073.　　　　Specification of Letters Patent.　　Patented Mar. 11, 1919.

Application filed May 25, 1918. Serial No. 236,575.

*To all whom it may concern:*

Be it known that I, THOMAS H. BOWER, a citizen of the United States, residing at Richmond, in the county of Chesterfield and State of Virginia, have invented new and useful Improvements in Journal-Bearings, of which the following is a specification.

This invention relates to bearings and especially to locomotive or other heavy bearings, the object being to provide a novel and convenient means which may be readily secured to or removed from the bearing for the purpose of holding the lubricant.

Another object is to provide a bearing which requires the minimum amount of machinery, so as to reduce the cost of manufacture and at the same time so construct the bearing as to increase the life of the same.

Other objects and advantages of the invention will appear when the following description is read in connection with the accompanying drawings, in which:—

Fig. 3 is a horizontal sectional view on the line 3—3 of Fig. 1;

Fig. 4 is a perspective view of the lubricant retaining section of the bearing removed from the bearing proper, the plates of which this section is formed being shown in separate relation;

Fig. 5 is a view similar to Fig. 2 illustrating the use of an oil pan in connection with the bearing.

Figure 1:
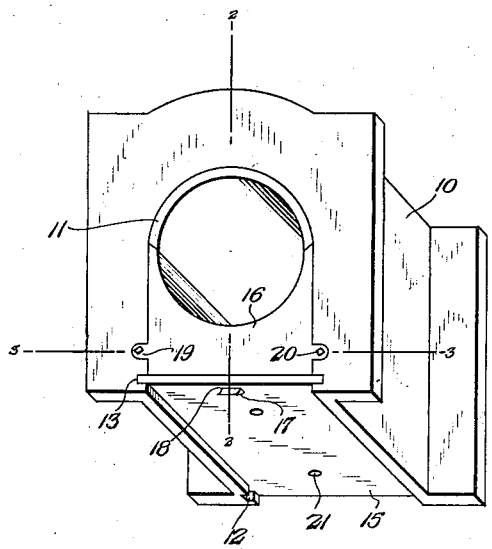
Figure 1 is a perspective view of a bearing constructed in accordance with the present invention.
Figure 2:
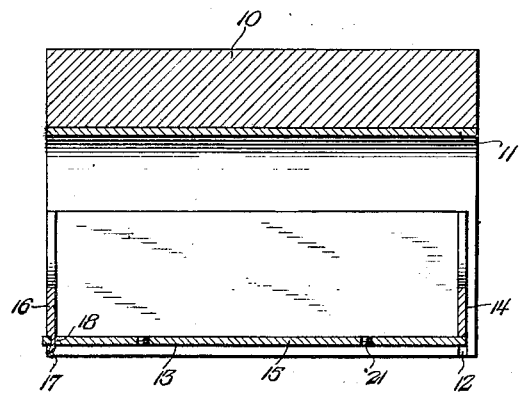
Fig. 2 is a vertical sectional view on a line 2—2 of Fig. 1.
Figure 6:
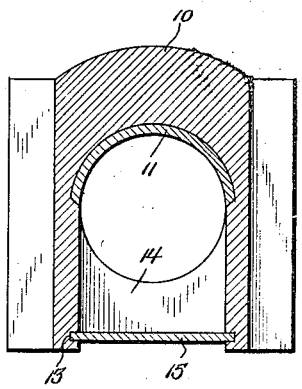
Fig. 6 is a transverse vertical section taken approximately on the central line of Fig. 2.

Referring in detail to the drawings, the reference character 10 indicates the bearing section of the bearing, or that section which carries the Babbitt metal lining 11, which contacts with the journal.

The novelty of the present invention resides in the manner of retaining lubricant within the bearing and for this purpose the bearing section 10 is provided with vertically disposed alined slots 12 at one end thereof and horizontally disposed alined slots 13 at the bottom of the bearing section. The slots 12 are adapted to receive an end plate 14 for the purpose of closing this end of the section 10, while the slots 13 receive a bottom plate 15, slidable in said slots beneath the end plate 12. The plate 15 serves to close the bottom of the section 10 and to retain the end plate 14 in position. A second end plate 16 is adapted to be secured to the opposite end of the section 10, the plate 16 being provided at its lower end with a tongue 17, adapted for engagement with a slot 18 formed in the adjacent end of the plate 15. Apertured ears 19 are formed upon opposite sides of the end plate 16 and are adapted to receive suitable fastening devices 20 for the purpose of securing the said plate to the section 10. This plate through the interlocking engagement of the tongue 17 with the slot 18, prevents the removal of the bottom plate 15 so that all the plates are securely held in position. Threaded openings 21 may be provided in the bottom plate 15 for the purpose of receiving grease indicators (not shown).

For the purpose of permitting of the use of oil as a lubricant, a pan 22 may be placed within the bearing and held in position by means of the plates, as shown in Fig. 5 of the drawings. This permits of the use of the bearing with either grease or oil as a lubricant and in either case provides for the ready removal of the lubricant holding section for the purpose of repacking or renewing the lubricant.

Various changes may be made in the form, proportion and minor details of construction and the right is reserved to make all changes as will properly fall within the scope of the appended claims.

Having described the invention, what is claimed is:—

1. A bearing comprising an upper bearing section provided with end and bottom grooves, an end plate slidable in the end grooves, a bottom plate slidable in the bottom groove and engageable under the end plate to hold the latter in position, a second end plate, means whereby the last mentioned plate may be secured to the bearing section and interlocking means between the bottom plate and the said second end plate.

2. A bearing comprising an upper bearing section provided with end and bottom grooves, an end plate slidable in the end groove, a bottom plate slidable in the bottom groove and engageable under the end plate to hold the latter in position, a second end plate, means whereby the last mentioned plate may be secured to the bearing section and a tongue and slot connection between the bottom plate and the said second end plate.

In testimony whereof I affix my signature.

THOMAS H. BOWER.